United States Patent [19]
Spichalsky

[11] Patent Number: 5,868,646
[45] Date of Patent: Feb. 9, 1999

[54] CONTROL ARRANGEMENT ACCOMMODATING REQUIREMENTS OF DIFFERENT COUNTRIES FOR MOTOR VEHICLES HAVING AN INTERNAL COMBUSTION ENGINE AND AN AUTOMATIC TRANSMISSION

[75] Inventor: Carsten Spichalsky, Lehre, Germany

[73] Assignee: Volkswagen AG, Wolfsburg, Germany

[21] Appl. No.: 926,546

[22] Filed: Sep. 10, 1997

[30] Foreign Application Priority Data

Sep. 10, 1996 [DE] Germany ............ 196 36 630.5

[51] Int. Cl.⁶ .................................................. B60K 41/00
[52] U.S. Cl. ............................................................ 477/97
[58] Field of Search .................................. 477/97; 701/56

[56] References Cited

U.S. PATENT DOCUMENTS

| | | |
|---|---|---|
| 4,838,125 | 6/1989 | Hamano et al. ............ 701/56 |
| 4,941,096 | 7/1990 | Ito et al. ..................... 477/97 |
| 5,396,420 | 3/1995 | Graf .......................... 364/424.1 |

FOREIGN PATENT DOCUMENTS 0513424  11/1992  European Pat. Off. .

*Primary Examiner*—Dirk Wright
*Attorney, Agent, or Firm*—Baker & Botts, L.L.P.

[57] ABSTRACT

A control arrangement for a motor vehicle having an internal combustion engine and an automatic transmission provides country-specific engine and/or transmission control commands which can be selected alternatively for different countries by a changeover device. The control arrangement permits the use, during production, of identical engine and transmission control units together with their control commands so that it is possible to activate simply in a country-by-country fashion the engine and/or transmission control commands, which determine, for example, the exhaust-gas behavior and the fuel consumption of the motor vehicle.

4 Claims, 1 Drawing Sheet

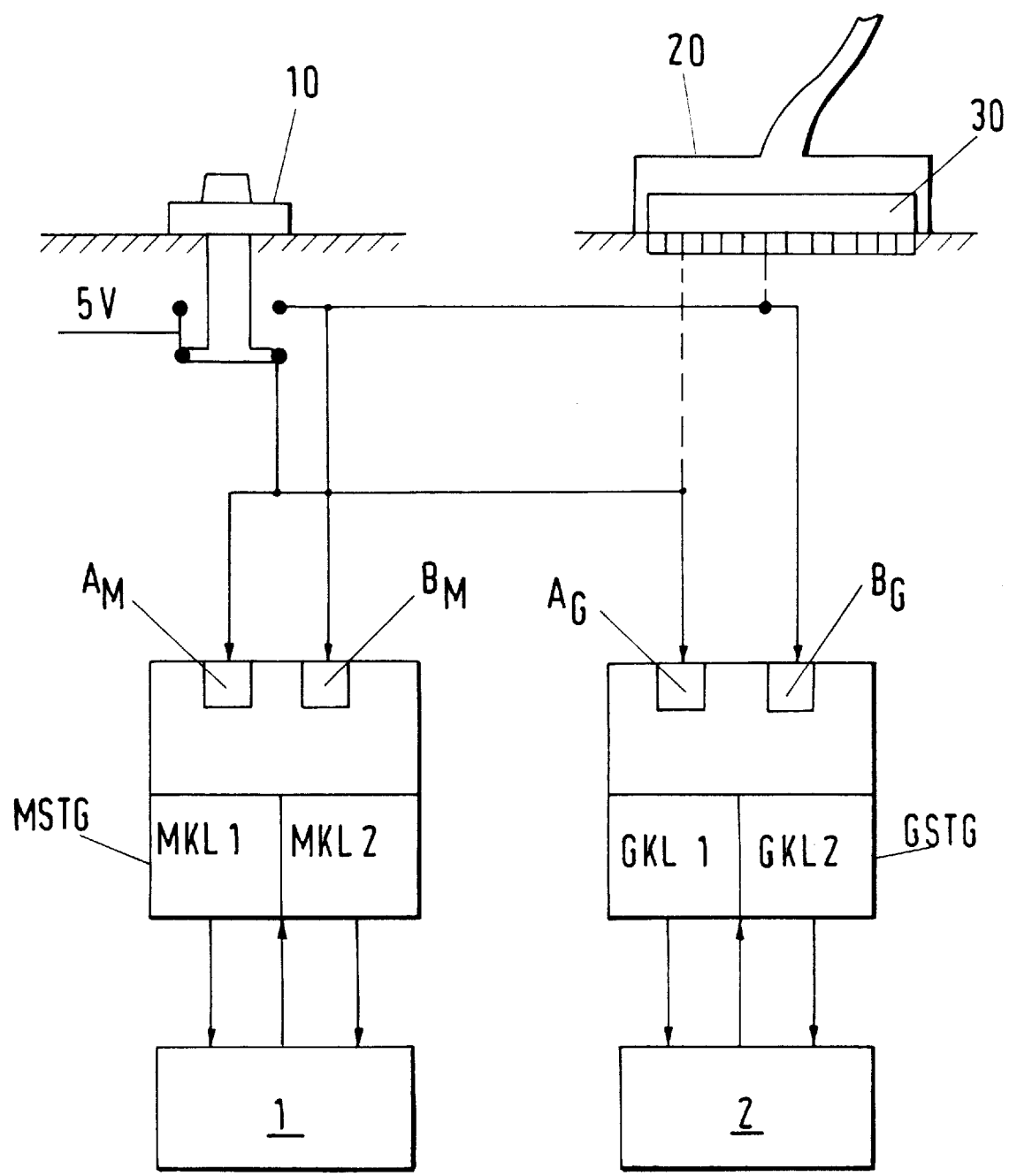

CONTROL ARRANGEMENT ACCOMMODATING REQUIREMENTS OF DIFFERENT COUNTRIES FOR MOTOR VEHICLES HAVING AN INTERNAL COMBUSTION ENGINE AND AN AUTOMATIC TRANSMISSION

BACKGROUND OF THE INVENTION

This invention relates to controllers for motor vehicles having an internal combustion engine and an automatic transmission and a control unit for controlling the operation of the engine and the transmission.

U.S. Pat. No. 5,396,420, for example, discloses a control arrangement for an automatic motor vehicle transmission and for an internal combustion engine of a motor vehicle, in which shifting and engine control characteristics are stored. Depending on the desired power output, the driving behavior of the driver and the particular driving situation, the control arrangement assures the availability of the desired engine torque, as well as, for example, that the automatic transmission is shifted appropriately with respect to full consumption or power output. Since motor vehicles are marketed worldwide, such engine and transmission control commands must be adapted country-by-country so that it is possible to observe for each country the particular national statutory provisions with respect to fuel consumption, exhaust-gas emission and, if appropriate, also maximum speed.

SUMMARY OF THE INVENTION

Accordingly, it is an object of the present invention to provide a control arrangement for motor vehicles which accommodates the requirements of different countries.

Another object of the invention is to provide a control arrangement in which adaptation of the relevant engine and transmission control commands can be performed more easily than in conventional control arrangements.

These and other objects of the invention are attained by providing a control arrangement for an engine and for a transmission which is connected to a changeover device by which country-specific engine and/or transmission control commands for each country of use, previously stored the control arrangement, can be activated. In one embodiment, the changeover device comprises, for example, a simple pressure or slide switch which has different switch positions and is accessibly mounted in the control arrangement.

In another embodiment of the invention, the changeover device is arranged to be activated from outside the vehicle. For this purpose the changeover to the country-specific engine and/or transmission control commands is performed with the aid of a motor vehicle diagnostic unit which is connected by a diagnostic plug to a diagnostic socket provided on the vehicle and communicates with the engine control unit and the transmission control unit.

In this case the selection of the country-specific engine and/or transmission control commands is preferably carried out at the motor vehicle manufacturer's assembly line, or in the workshop of the national importer in the particular country.

On the other hand, the country-specific adaptation arrangement should prevent the vehicle owner from being able to operate it freely.

The country-specific engine and transmission control commands may comprise, for example, commands for the observance of statutory fuel consumption regulations, for example in the case of specific vehicle speeds, of exhaust-gas emission regulations and also, if appropriate, of maximum vehicle speeds.

BRIEF DESCRIPTION OF THE DRAWING

Further objects and advantages of the invention will be apparent from a reading of the following description in conjunction with the accompanying drawing which is a schematic block diagram illustrating a representative embodiment of a control arrangement in accordance with the invention.

DESCRIPTION OF PREFERRED EMBODIMENTS

In the typical embodiment shown in the drawing an internal combustion engine 1 and an automatic transmission 2 for a vehicle are represented diagrammatically. These two vehicle drive units are connected respectively to an engine control unit MSTG and to a transmission control unit GSTG, in which units various engine control characteristics MKL and transmission characteristics GKL are stored.

Also stored in these control units are country-specific control commands $A_M$ and $B_M$ for the country-specific control of the internal combustion engine 1, or $A_G$ and $B_G$ for the country-specific control of the automatic transmission 2. The commands $A_M$ and $A_G$ or $B_M$ and $B_G$ can be accessed alternatively.

Finally, the illustrated control arrangement includes a changeover device 10 which is in the form of a spring-loaded pushbutton 10 that can assume either of two different switch positions for countries A and B, respectively. In this case, the switching contact for country A and country B is supplied with a switching voltage of, for example, 5 volts which, given an appropriate switch position, can be relayed through corresponding conductors to the engine control unit MSTG and to the transmission control unit GSTG.

These two motor vehicle control units are also connected by dashed signal lines to a diagnostic socket 30 in the motor vehicle to which a diagnostic plug 20 of an external vehicle diagnostic unit (not shown) is attached. This diagnostic unit, as a rule a small computer, can be used to carry out the selection of the country-specific engine or transmission control commands by means of simple command inputs.

The control arrangement of the invention thus permits the country-specific control commands for the engine control unit and the transmission control unit to be selected quickly in a simple and economic way, for example directly during production. With this arrangement, the control commands for a multiplicity of countries can be stored in the two control units.

Although the invention has been described herein with reference to specific embodiments, many modifications and variations therein will readily occur to those skilled in the art. Accordingly, all such variations and modifications are included within the intended scope of the invention.

I claim:

1. A control arrangement for a motor vehicle having an internal combustion engine and an automatic transmission comprising:

an engine control unit in which engine control commands are stored;

a transmission control unit in which transmission control commands are stored; and a changeover device connected to the engine control unit and/or to the transmission control unit to activate country-specific engine and/or transmission control commands in at least one of the control units.

2. A control arrangement according to claim 1 wherein the changeover device comprises a switch in the motor vehicle or on at least one of the control units.

3. A control arrangement according to claim 1 wherein the changeover device comprises an input interface in the vehicle through which changeover signals can be conducted to the engine control unit and the transmission control unit from an external source.

4. A control arrangement according to any one of claims 1 to 3, wherein the country-specific engine and/or transmission control commands relate to country-specific fuel consumption regulations, exhaust-gas emission regulations and/or maximum vehicle speeds.

* * * * *